(12) United States Patent
Pluester et al.

(10) Patent No.: US 7,846,333 B2
(45) Date of Patent: Dec. 7, 2010

(54) POROUS MEDIA

(75) Inventors: Wilhelm Pluester, Longmeadow, MA (US); Christian Ziegmann, Ahrensburg (DE)

(73) Assignee: Effendorf AG

( * ) Notice: Subject to any disclaimer, the term of this patent is extended or adjusted under 35 U.S.C. 154(b) by 568 days.

(21) Appl. No.: 10/993,909

(22) Filed: Nov. 18, 2004

(65) Prior Publication Data
US 2005/0178720 A1 Aug. 18, 2005

Related U.S. Application Data

(60) Provisional application No. 60/524,931, filed on Nov. 24, 2003.

(51) Int. Cl.
*B01D 39/02* (2006.01)
(52) U.S. Cl. ............... 210/263; 55/514; 55/523; 96/108; 96/153; 65/17.3; 65/21.1; 210/266; 210/483; 210/499; 210/502.1; 210/510.1; 422/100; 422/101; 264/41; 264/203; 435/287.7; 432/1; 432/9; 502/401; 502/407
(58) Field of Classification Search ............ 210/263, 210/502.1, 503–508, 198.2, 266, 483, 499, 210/500, 510.1, 656; 422/68.1, 100, 101, 422/283, 922; 432/1, 9; 264/239, 257, 41, 264/234, 203; 428/402, 407, 403; 435/287.7; 65/17.3, 21.1; 502/401, 402, 407; 55/514, 55/523; 96/108, 153
See application file for complete search history.

(56) References Cited

U.S. PATENT DOCUMENTS

| | | | | |
|---|---|---|---|---|
| 4,061,807 A | * | 12/1977 | Shaler et al. | 428/36.4 |
| 4,871,824 A | * | 10/1989 | Heilmann et al. | 526/304 |
| 5,015,373 A | * | 5/1991 | Carr et al. | 210/198.2 |
| 5,552,325 A | | 9/1996 | Nochumson et al. | |
| 5,593,824 A | | 1/1997 | Treml et al. | |
| 5,595,649 A | * | 1/1997 | Markell et al. | 210/198.2 |
| 5,616,407 A | * | 4/1997 | Fritz et al. | 442/118 |
| 5,658,548 A | | 8/1997 | Padhye et al. | |
| 5,808,041 A | | 9/1998 | Padhye et al. | |

(Continued)

FOREIGN PATENT DOCUMENTS

EP 0987327 A1 3/2000

(Continued)

OTHER PUBLICATIONS

Chen, Carton W. and Thomas, Charles A. Jr., Recovery of DNA Segments from Agarose Gels, Analytical Biochemistry, 1980, pp. 339-341, vol. 101, United States.

(Continued)

*Primary Examiner*—Joseph W Drodge
(74) *Attorney, Agent, or Firm*—Todd Lorenz; Arnold + Porter LLP

(57) ABSTRACT

A porous media, a housing containing a porous media and methods for fabricating the housing containing a porous media are provided. The porous media is composed of varying amounts of sorptive binding particles in combination with polymer particles, for example silica particles mixed with polyethylene beads. The porous media is sintered into target housings, for example pipette tips, for use in desalting, purifying and separating biomolecules in target samples. The porous media is also formed into porous media discs via pressure and heating for insertion into housing devices.

24 Claims, 9 Drawing Sheets

U.S. PATENT DOCUMENTS

| | | |
|---|---|---|
| 5,906,796 A | 5/1999 | Blevins et al. |
| 6,020,186 A | 2/2000 | Henco et al. |
| 6,043,354 A | 3/2000 | Hillebrand et al. |
| 6,048,457 A | 4/2000 | Kopaciewicz et al. |
| 6,074,871 A | 6/2000 | Koontz |
| 6,110,363 A | 8/2000 | Hillebrand et al. |
| 6,200,474 B1 | 3/2001 | Kopaciewicz et al. |
| 6,221,655 B1 | 4/2001 | Fung et al. |
| 6,258,870 B1 | 7/2001 | Hubbell et al. |
| 6,391,429 B1 * | 5/2002 | Senkus et al. ............... 428/198 |
| 6,451,260 B1 * | 9/2002 | Dusterhoft et al. ......... 422/68.1 |
| 6,835,311 B2 * | 12/2004 | Koslow ..................... 210/490 |
| 7,740,141 B2 * | 6/2010 | Reid et al. ................. 210/506 |
| 2002/0094568 A1 | 7/2002 | Hei |
| 2003/0029789 A1 | 2/2003 | Patil |
| 2005/0005769 A1 * | 1/2005 | Seguin et al. ................ 96/108 |

FOREIGN PATENT DOCUMENTS

| | | |
|---|---|---|
| EP | 1015098 B1 | 8/2002 |
| WO | WO 93/11218 A1 | 6/1993 |
| WO | WO 93/11221 A1 | 6/1993 |
| WO | WO 95/01359 A1 | 1/1995 |
| WO | WO 95/18851 A1 | 7/1995 |
| WO | WO 96/08500 A1 | 3/1996 |
| WO | WO 97/26540 A1 | 7/1997 |
| WO | WO 98/46797 A1 | 10/1998 |
| WO | WO 03/080211 A1 | 10/2003 |

OTHER PUBLICATIONS

European Search Report, Application No. 04027790, Feb. 4, 2005, 5 pages.

European Supplemental Search Report (07 002 457.5) mailed Sep. 9, 2009.

* cited by examiner

POROUS MEDIA

CROSS REFERENCE TO RELATED APPLICATIONS

This application is a non-provisional application of U.S. patent application Ser. No. 60/524,931, filed Nov. 24, 2003, and entitled Porous Media the contents of which are hereby incorporated herein in their entirety.

FIELD OF INVENTION

The invention generally relates to porous media for purification, concentration and/or sized based exclusion of biomolecules, and to housings that incorporate the porous media, and to the methods for fabricating such porous media containing housings. More specifically, the invention relates to housings, for example pipette tips and filter plates, containing a porous media comprising polymer particles and binding beads, and to the methods used to fabricate the same.

BACKGROUND OF INVENTION

The purification, concentration and/or size-based separation of target biomolecules within and from a sample is important to a number of molecular biology and biochemistry based techniques. For example, desalting of peptide solutions prior to spectral analysis is critical to the sensitivity and validity of the analysis. These aims are especially true with regard to smaller volume bio-molecule containing sample sizes, i.e., microliters of sample solution, or for more dilute bio-molecule containing samples, i.e., samples having less than about 10 μg/ml of target bio-molecule in solution.

Conventional purification, concentration and sized-based separation techniques have focused on various filtration and chromatographic techniques. For example, samples are positioned or placed on a pre-set filter membrane within a microfuge tube, the filter membrane defining pore sizes that prevent the target bio-molecule from washing through the filter. Centrifugation of the microfuge tube forces smaller molecules within the sample to pass through the pores of the filter, while retaining the larger (than the pores) size molecules to remain on the filter. This process ultimately concentrates, purifies and separates target biomolecules from other smaller constituents. However, these ultrafiltration techniques often require long centrifugation or filtration steps, to move the sample through the filter pores. Furthermore, ultrafiltration membranes are very sensitive to viscosity, often resulting in clogging problems.

Recently, a polymer matrix based plug has been developed for separating and concentrating target molecules from a sample. The plug is prepared by casting the polymer and sorptive bead material into an appropriate housing, for example a pipette tip. See, e.g., U.S. Pat. No. 6,200,474. The homogenous polymer matrix formed by the casting process provides a continuous polymer material capable of entrapping sorptive type particles, the entire plug acting to concentrate, purify and separate target biomolecules. Unfortunately, however, polymer matrix-based techniques require solvent based casting techniques, which often require time, harmful solvents, and specialized equipment for the fabrication of housing containing plugs.

Against this backdrop the following disclosure is provided.

SUMMARY OF INVENTION

In one aspect, the present invention provides porous media for purifying, concentrating and separating out biomolecules within a target sample. Preferably, the porous media of the invention comprise a non-homogenous combination of sorptive beads and discontinuous polymer particles. The porous media of the invention is generally from about 30% to about 70% sorptive beads by weight, although other ranges are envisioned to be within the scope of the invention. In one particular embodiment, the porous media of the invention comprises about 50% sorptive bead by weight and 50% polymer particle by weight. In some embodiments the polymer particles comprise polyethylene beads and the sorptive beads comprise a derivatized or functionalized silica.

In another aspect, housings are provided incorporating the porous media of the invention. For example, the porous media is sintered into the housing using temperatures that do not typically exceed the melting temperature of the polymer constituent of the porous media. In some embodiments the housing is a pipette tip preferably having a depth of from about 1 to 3 mm of porous media, although other depths are envisioned to be within the scope of the present invention. The invention also provides housings that are used as spin devices and as filter plates. Filter plate embodiments are typically of multi-well formats.

In a further aspect, the invention provides methods for fabricating the porous media and porous media containing devices of the invention, including the sintering parameters and automation techniques.

In another aspect, a device for purifying or concentration a solution is provided. The device comprises a surface modified high density polyethylene particle, and a housing for constraining the surface modified high density polyethylene particle. The surface of the modified high density polyethylene particle purifies or concentrates a solution passed through the device. The device can be a multi-well filter plate or a pipette tip.

In another aspect, the invention provides a method for lysing a cell comprising: providing porous media that comprises sintered hydrophobic high density polyethylene particles, contacting the cell with the porous media, passing the cell over the porous media at least once to shear the cell and release the cell's contents, and collecting the lysed cell in a container.

In another aspect, the invention provides for a method for size based separation of a first component from a second component comprising: providing a purification device comprising a porous media, wherein the porous media comprises 5 to 95% porous sorptive beads, by weight, the porous sorptive beads having pores, and contacting the first component and second component to the purification device. The first component and second component are separated due to differential binding properties of the first and second component within the pores of the porous sorptive beads.

These and various other claims, features and advantages of the invention will be apparent from a reading of the following detailed description and a review of the appended claims.

BRIEF DESCRIPTION OF DRAWINGS

FIG. 5 is a silver stained SDS-polyacrylamide gel having the stained amount of CYT C removed from a sample by the porous media (GUR X120 with 50% ICN RP-18) of the invention as compared to the amount that remained in the flow-through.

DETAILED DESCRIPTION OF INVENTION

Figure 1:
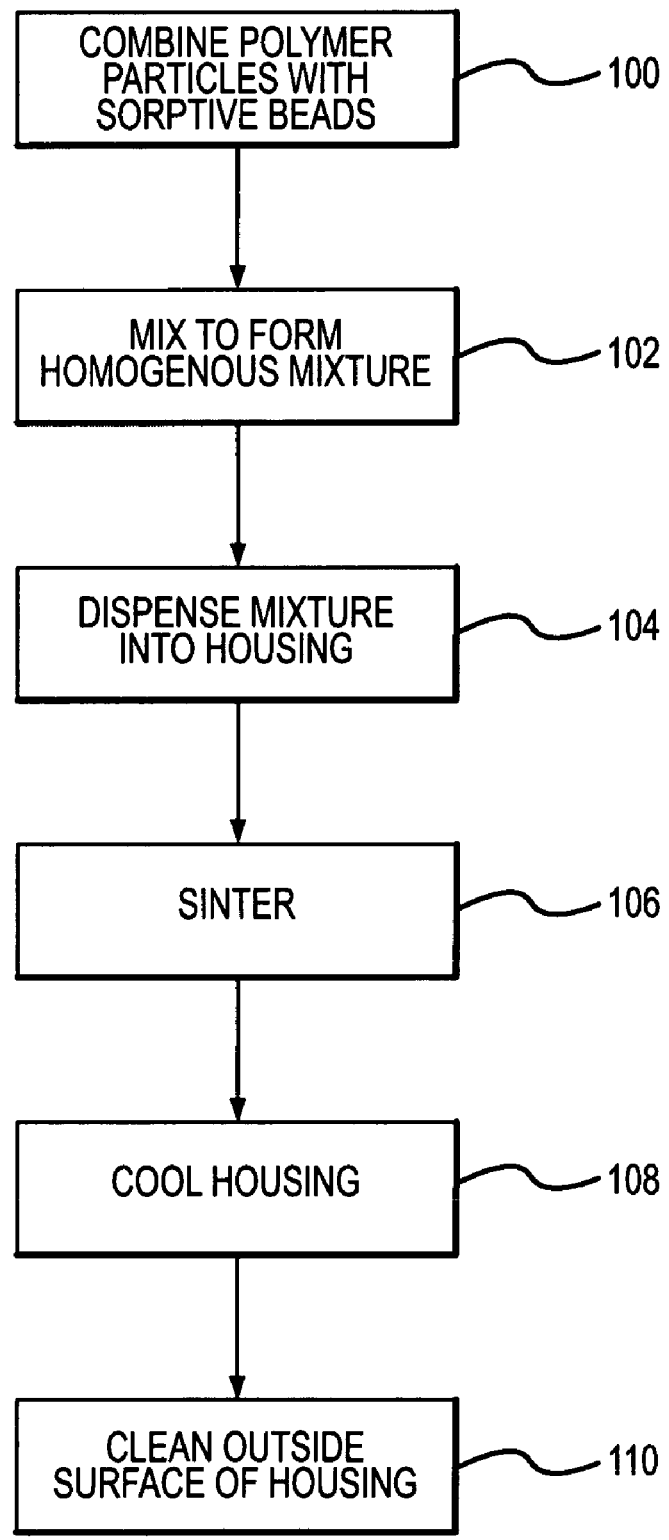
FIG. 1 is a flow diagram illustrating one method for fabricating a porous media containing housing.

The following definitions are provided to facilitate understanding of certain terms used frequently herein and are not meant to limit the scope of the present disclosure:

Definitions

"Housing" refers to any container having at least one open end, and preferably two open ends, for constraining the porous media of the invention. Housings of the invention include pipette tips, columns, wells within a multi-well plate, and the like. Housings of the invention are typically composed of polymers, for example thermoplastic polymers, like polypropylene.

"Molecular grade water" refers to water having a conductivity of approximately 0.83 μS (<1.3 μS), a bioburden of ten or less CFU per 100 ml of water, an endotoxin count of 0.03 EU/ml and a total organic carbon (TOC) of approximately 0.178 ppm.

"Polyethylene" or "high density polyethylene" refer to a thermoplastic high density polymer having the general formula $(-H_2C-CH_2-)_n$.

"Surface modified high density polyethylene" refers to a thermoplastic high density polyethylene having any number of surface functional modifications, including, but not limited to, —OH, —COOH, —NH$_2$, —SH, -epoxide, and the like. In addition, surface modifications may include multiple functional modifications within the same porous media and/or having secondary linker groups, or protein modified high density polyethylene particles, i.e., biotin labeled or antibody labeled high density polyethylene particles.

"Polypropylene" refers to a thermoplastic polymer having the general formula $(C_3H_5)_n$.

In preferred embodiments, the invention provides a housing, such as a pipette tip, containing a defined porous media for the concentration, purification and sized-based separation of target analytes from a sample. The porous media of the invention typically comprise polymer particles, such as polyethylene, randomly combined with sorptive beads, for example, silica beads. The porous media can be sintered into a portion of the housing at an appropriate depth for the required task, or can be formed into appropriately sized discs using a combination of pressure to form the correct sized disc, followed by baking at below polymer melting temperatures to provide enough energy to keep the disc together for the required mechanical manipulation of inserting the disc into a target housing.

In addition, the invention provides filter plates and spin devices containing the subject porous media. Embodiments are fabricated by sintering the porous media or by inserting correctly sized porous media discs into each well or tube of a filter plate or spin device.

In another embodiment of the invention, methods for fabricating a housing containing porous media of the invention are disclosed. Methods of the invention are fast and efficient, especially as compared to existing conventional methods, for example casting a polymer matrix into a target housing.

Sorptive Beads

Sorptive beads as used herein refers to sorptive surfaces for capturing, trapping, binding or other like process of a target analyte. Typically, suitable sorptive beads will include silica, derivatized silica, and the like, having a melting temperature greater than the melting temperature of the polymer particles of the porous media. Sorptive beads of the invention can also be composed of styrene/divinyl benzene linkers, methacrylate/ethylenedimethacrylate linkers, Amberlite XAD 2000 (Tosoh Biosep, Inc.), sephabeads, e.g., SP850 Sephabeads (Tosoh Biosep, Inc.), activated graphite, diatomaceous earth (Sigma D-5384), as well as silica based beads. In more preferred embodiments the sorptive beads are hydrophobic particles and are silica based beads, including derivatized silica beads. Binding particles suitable for use herein include a range of average diameters, typically from 100 nm to 1000 μm, and in some cases from 1 μm to 100 μm. In addition, sorptive beads can include particles with or without pores. With regard to beads that include pores, pore sizes that define channels within the beads are typically in the range of from 10 Å to about 10000 Å. In preferred embodiments, the average diameter of the binding beads is from about 1 to about 100, having pores that define channels that are from about 50 to about 1000 Å in average diameter.

In particularly preferred embodiments, the hydrophobic particles comprise silica, i.e., particles formed at least partially from silicon dioxide, and including derivatized silica, i.e., derivatized silicon dioxide. Derivatized silica beads can have carbon chains that range from a C-2 to C-18, but are typically C-4, C-8 or C-18. Illustrative silica particle examples include C-18 functionalized silica having a variety of useful parameters, for example: R202 (Degussa AG), ICN-RP18 (ICN, Inc.), CPG-SM (CPG, Inc.), and CPG-LG (CPG, Inc.). These silica particles include particles having no pores, 100 Å pores, and 500 Å pores, and have particle diameters from several hundred nanometers to 150 μm. For example, ICN RP-18 particles have an average diameter of 32 to 63 μm and pores with channel diameters that average about 100 Å.

Silica binding particles, for example, are useful for a wide range of analyte sorption, including binding of biomolecules, including, DNA, RNA, polypeptides, and the like from a solution. For example, ICN RP-18 can be used to purify/desalt peptides and proteins, especially in chromatographic columns.

Polymer Particles

Polymer particles for use in porous media embodiments of the invention include polymers that have lower melting temperatures than the polymer materials used to prepare the housing such as, e.g., polypropylene pipette tip. An illustrative polymer useful as the polymer component of the porous media is high density polyethylene. Other high density polyethylene like polymers can also be used in the context of the invention. In general, the polymer particles of the invention will have various molecular weights and diameters of between 100 nm to 1000 μm, and typically 1 μm to 500 μm. Illustrative polymers include GUR X120 (Ticona AG, Germany), GUR 2122 (Ticona AG, Germany), GUR 4120 (Ticona AG, Germany), and GUR 4186 (Ticona AG, Germany).

The polymer particles of the invention are capable of being sintered together with the sorptive beads of the invention to form a porous media. Ideal polymer particles have parameters that allow the porous media to form or define appropriate channels between each bead that facilitate flux of analyte through the media.

Another useful characteristic of the polymer molecules of the invention is that the polymer becomes sticky at temperatures between 100 and 180° C., and more particularly between about 130 and 160° C. At these temperatures the polymer particles form the interactions necessary, in conjunction with sintering pressures, to structurally hold the polymer particles onto the binding particles and housing walls of the invention. Further, the polymer constituent of the porous media should not completely melt at these temperatures and form a continuous polymer matrix, as produced in the prior art.

If necessary, high density polyethylene particles can be modified to minimize any non-specific binding. For example, particle surfaces can be etched by plasma discharge to hydrophilize the polymer surface and therefore reduce the non-specific binding.

Porous Media

Embodiments of the porous media of the invention include a non-homogenous mixture of binding sorptive beads and polymer particles. Polymer material and sorptive beads are typically combined/mixed at predetermined ratios based on weight. In general, the ratio of polymer particles:sorptive beads is from about 5:95 to about 95:5, and is typically from about 30:70 to about 70:30, with some embodiments being about 50:50. In alternative embodiments, a thin film of sorptive beads can be layered on mixed porous media to enhance the capacity of the sorptive properties without effecting the flowability of the sample through the media.

In general, the sorptive beads within the porous media must provide sufficient analyte binding sites to perform the sorptive actions of the porous media. On the other hand, the polymer particles provide the structural integrity of the porous media, maintaining channel diameters through and around the sorptive particles, thereby allowing flowability of samples through the porous media. As such, the porous media of the invention provides structures that are both capable of maintaining flow-through within the porous media, but still have a multitude of analyte binding sites. Typical back pressures of these embodiments are those used in pipetting samples in most common applications, i.e., desalting a polypeptide digest, concentrating DNA in an aqueous solution, and the like.

In one preferred embodiment the porous media is composed of 50% C18 functionalized silica by weight combined with 50% GUR X120 polymer, by weight. In some embodiments the porous media is pre-sieved prior to use in a housing to remove non-conforming components. For example, the porous media can be pre-sieved with a 125 to 160 μm screen. Another preferred embodiment of the porous media is composed of 40% C-18 functionalized silica by weight combined with 60% 2122 polymer, by weight.

Preparation of the porous media is preferably accomplished by first mixing the polymer particles and binding particles together. Mixing is typically performed for a time sufficient to thoroughly mix the two components together, preferably the porous media maintains a viscosity that allows the media to be drawn into a dispensing tube or column. The porous media is next sintered into the target housing using known sintering techniques. Optimal sintering parameters include the time, temperature, and degree of completion required for a particular porous media to be positioned within a target housing. For example, when the polymer is polyethylene, a one to two minute, 140-145° C. sintering procedure is performed. Generally, the sintering process should be sufficient to "fix" the porous media in the housing without causing significant damage, i.e., melting or curvature, to the housing.

It is also envisioned that the porous media of the invention can be fabricated into porous media discs. Preferably, the porous media of the invention is compacted into an appropriate diameter and depth self-supported disc shape. Discs are heated in a baking oven or other like device to temperatures between 100 and 180° C., and cooled for insertion into appropriate housings.

In general, the porous media of the invention is sufficiently held together to maintain its structural integrity. Amounts of porous media useful, for example in a pipette tip, vary dependent on the application and the composition of the porous media, i.e., amounts of binding particles. However, depths of 0.5 to 5 mm in a pipette tip, and 0.5 to 10 mm in a column, having roughly 50:50 polymer to binding particles, are typically useful for most applications. Note that as the depth of the porous media increases, the flow rate typically decreases, so that some variation in porous media composition can be exchanged for depth and diameter of the housing.

In another embodiment, the porous media consists solely of a surface modified high density polyethylene particle. Such modified polymer particles incorporate the sorptive binding characteristics of the sorptive beads of the present invention, requiring only the polymer portion of the porous media. Illustrative functional surface modifications include —OH, —COOH, —NH$_2$, —SH, -epoxide, and the like. In addition, surface modifications may include multiple functional modifications within the same porous media and/or having a secondary linker groups, or protein modified high density polyethylene particles, i.e., biotin labeled or antibody labeled high density polyethylene particles. Importantly, the surface modified high density polyethylene particles are useful in affinity based separations as well as purification of large biomolecules (MW>50,000).

Note that embodiments of the present invention are described in terms of weight. The wide range of composition percentages is due to the impact of porosity and bead size on density of the sorptive beads. For example, a porous media comprising 50% sorptive beads could contain 80% of the porous media by volume if the density is significantly less than the high density polyethylene.

Housing Devices

Any number of different housing configurations can be used in conjunction with the porous media of the invention. For example, housings composed of different types of polymers, metals, and the like can be used to 'house' or constrain the porous media. Housings can have one or two open ends, and can include optionally a frit to ensure that the porous media does not escape the housing.

A preferred embodiment of the housing is a pipette tip. Typically, pipette tips have a conical shape with two open ends, an inlet end and an outlet end. The inlet end is typically of a smaller diameter than the outlet end. Preferred embodiments of the invention include a pipette tip that incorporates the porous media of the invention. Typically, only a portion of the pipette tip contains the porous media to a pre-determined depth. Pipette tips of the invention can include smaller volume tips, for example 10 µl tips, or larger volume tips, for example, 1 ml tips. The pipette tip itself is usually composed of polypropylene. In one embodiment, a 10 µl tip includes a 1-3 mm deep 60% polyethylene (GUR X120): 40% ICN RP-18 silica particle porous media sintered in place at the outlet end of the tip. As previously discussed, the depth of the porous media can be varied dependent on the capacity required for the use, and may also be modified in relation to the % binding particle used in the porous media combination.

Preferably the porous media is fixed in-place and remains in the outlet end of the tip under normal use conditions, i.e., few if any of the polymer particles or binding particles are expelled from the tip during a pipetting process (see Examples below). Using the methods of the invention, and unlike the prior art, the porous media does not typically require a frit or other mechanical means for maintaining the porous media in the tip, although the invention can include such embodiments.

In addition, other preferred housings include filter plates and spin columns or other spin devices. Filter plates or spin devices having 0.5 to 5 mm of porous media per well (of a multi-well plate) or tube (of a spin device) can effectively replace conventional filter based technology.

Methods for Fabricating Housings That Include a Porous Media

The invention also provides methods for fabricating housings that include the porous media embodiments of the invention. A preferred method for incorporating porous media of the invention in a portion of the housing of the invention is through sintering. For illustrative purposes, the fabrication of a pipette tip having a specific porous media embodiment will be described. Note that method embodiments of the invention are within the scope contemplated for the invention, all of which generally follow the steps discussed below in FIG. 1.

FIG. 1 illustrates a process for fabricating multiple pipette tips, each tip having 1-3 mm porous media located near or continuous with the outlet end of the tip. Initially, a predetermined amount of polyethylene, is mixed with a predetermined amount of silica beads, C-18, to form a 50:50 mix by weight 100. The two components are mixed thoroughly at room temperature to form a non-homogenous mixture 102. The media is fed, for example by gravity, via a dispensing unit, that dispenses a predetermined amount of porous media into a pipette tip 104. One preferred example is pipette tips that have from 1-3 mm of porous media positioned at the outlet end of each tip. In general little if any of the porous media escapes from the outlet end of the tip.

Because the outlet end of the pipette tip is fairly narrow, the porous media typically will remain in the tip prior to any sintering of the media within the tip. Automation of the process allows for sintering blocks to be pre-loaded with the required number of target pipette tips. The tips thus sintered at approximately 140° C. for about two minutes 106.

Temperature control in the sintering blocks is determined by the type of polymers in use in the housing and in the porous media. Typically, the outlet end of the pipette tip is heated to a predetermined temperature for a predetermined amount of time. For example, if the pipette tip is composed of polypropylene and the porous media has a polymer element composed of polyethylene, the tip is heated for about two minutes from about 140 to 145° C. The heat provides sufficient energy to sinter the porous media into the outlet end of the pipette tip. The pipette tip is removed from the sintering block and allowed to cool 108. Additionally, any excess porous media that has been expelled from the tip is wiped off of the tip 110. The amounts of expelled media will vary dependent of the composition of the porous media and the sintering parameters used in preparing the 'loaded' housing device. In preferred embodiments of the invention, a plurality of tips are fabricated simultaneously using automated dispensing and sintering block elements.

Figure 2:
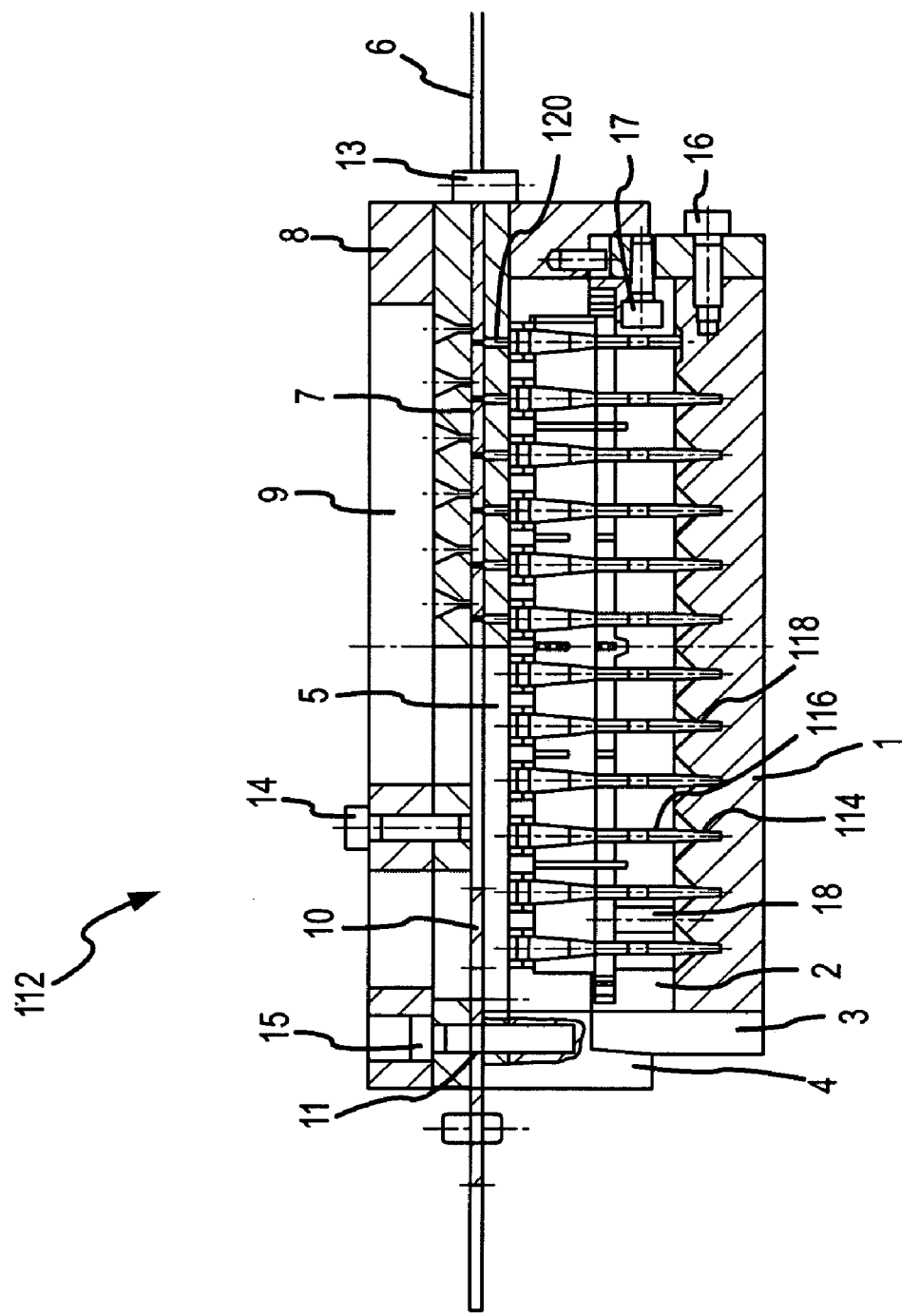
FIG. 2 is a cross sectional view of a sintering block for use with embodiments of the present invention.

An example of an automated manufacturing sintering block for use in the present invention is shown in FIG. 2. The sintering block 112 has a series of cavities 114 for receiving pipette tips 116. The cavities 114 are substantially the same contour as pipette tips 116 and have a depth to allow the outlet end 118 of the tip to be enveloped by the block to a depth of at least 4 mm. Dispensing heads 120, operably attached to the block 112, directly dispense a pre-determined amount of porous media into each recipient tip. A heating element is capable of heating the block to an accurate temperature. Note that the porous media can be pre-sieved to facilitate delivery of the porous media to the outlet of the pipette tip, prior to tip heating. The pre-sieving device is not shown.

Porous Media Elution Buffer

Embodiments of the present invention include hydrophobic elution buffers useful in "reverse phase" applications run over the porous media of the invention. For example, using a combination of the porous media of the invention with a hydrophobic elution buffer, the amount and concentration of a protein increased dramatically over that obtained using conventional elution buffers (see Example 6).

Embodiments of the present invention include elution buffers as described in Table 1:

TABLE 1

Embodiments of Porous Media Elution Buffer

| Reagent | Elution buffer 1 (µl) | Elution buffer 2 (µl) | Elution buffer 3 (µl) | Elution buffer 4 (µl) |
|---|---|---|---|---|
| 100% Acetonitrile | 500 | 750 | 250 | — |
| 2.5% TFA | 40 | 40 | 40 | 40 |
| n-propanol | — | — | 100 | 200 |
| molecular grade water | 460 | 210 | 610 | 760 |
| Total | 1000 | 1000 | 1000 | 1000 |

Assays Incorporating Porous Media Embodiments of the Present Invention

Housings having the porous media of the present invention can be used in a number of assays. Porous media embodiments of the present invention can function in numerous capacities including, filtration, purification and concentration, chemical housing, manipulation and as an indicator.

The porous media of the present invention can be used to eliminate contaminates in a sample, for example, salt, metal ions, endotoxins, dye and the like via the combined size exclusion and hydrophobicity linked properties of the different media embodiments. For example, removal of endotoxins (lipopolysaccharides) from a transfection reaction dramatically increases the transfection efficiency of that reaction. Here, a combination of size exclusion and hydrophobic interaction chromatography could be used. For example, porous C-4 Beads with an optimized pore size.

In addition, porous media embodiments of the present invention can be used in purification and/or concentration of target analytes in a sample, for example, in the purification and/or concentration of plasmids, RNA, gDNA, and the like. Here the sorptive bead portion of the media is important, with type and amount critical to the media's capacity for purifying and/or concentrating a target analyte (for example see Table 2).

Further, porous media embodiments of the present invention can be used as chemical housing structures where the sorptive beads are replaced or modified to include the chemical of interest. For example, the polymer portion of the porous media can constrain the chemical of interest from being removed from the housing, for example, pipette tip, until the chemical of interest reacts with a sample, e.g., loading dyes can be housed in the pipet tip, adding a measured amount of dye to a gel sample.

Further still, the porous media embodiments of the present invention can be used to manipulate cells and other like materials. For example, the composition of the porous media of the invention can be optimized for simply acting as a leaky barrier for cells and other like materials to be sheared apart against and around.

Finally, the porous media embodiments of the present invention can be used in conjunction with a clear viewing chamber as an indicator device. For example, pH indicator material can be interchanged or attached to the sorptive beads of the porous media. Polymer particle/sorptive/pH indicator material chambers are then contacted to the sample to be analyzed. The pH indicator after reacting with the sample is directly viewed within the porous media containing chambers.

TABLE 2

Potential Porous Media Embodiments of the Invention

| Porous Media Utility | Illustrative Embodiments | Potential Strategy |
|---|---|---|
| Filtration: Elimination of Contaminants | salts | Size Exclusion (similar to dye removal example, below) |
| | metal ions | Chelex resin within plug |
| | debris | Either bind/wash elute of ligand or filtration |
| | endotoxin | Hydrophobic Interaction Chromatography (HIC) or combination of HIC/SEC (size exclusion) to remove amphipathic LPS from larger DNA |
| | dNTPs | Size Exclusion or combination of HIC/SEC |
| | dye | HIC or combination of HIC/SEC |
| | primers | HIC or combination of HIC/SEC |
| | gDNA | Chaotropic Silica binding |
| | RNA | Silica or Oligo-dT (for poly-A) |
| | Heme | Iron |
| | DNase | HIC Ion Exchange (IEX) |
| | Detergent | Hydrophobic interaction |
| | Enzyme | HIC, IEX or Affinity purification |

TABLE 2-continued

Potential Porous Media Embodiments of the Invention

| Porous Media Utility | Illustrative Embodiments | Potential Strategy |
|---|---|---|
| | Water Purification | Filtration |
| | PCR Contaminants | Combination of other contaminant removal techniques (Chelex, Nucleic Acid, etc.) |
| | Nucleic Acid Removal From Water | Silica or Cu |
| Molecular Weight Cut-Off | Protein | SEC or combination of SEC/HIC |
| | Nucleic acid | SEC or combination of silica binding/SEC |
| Purification and Concentration | Plasmid | Bind-wash-elute with Silica |
| | RNA | Silica or Oligo-dT |
| | gDNA | (Lysis methodology under Manipulation heading), Silica bind-wash-elute |
| | PCR Products | Silica bind-wash-elute |
| | Protein (column chromatography) | Almost any column chromatography technology can be mimicked in miniature |
| | Protein purification via SEC | Size Exclusion |
| | Protein purification via IMAC | Immobilized metal affinity chromatography |
| | Protein purification via HIC | Hydrophobic interaction |
| | Protein purification via Hydrophilic interactions | Hydrophilic interaction chromatography |
| | Protein purification via IEX | Ion Exchange |
| | Protein purification via Affinity | Using: Antibodies, Ligands, Tags, Dyes, or Post-Trans. Modif |
| | His-Tagged Protein | Nickel |
| | Digested NA | Silica bind-wash-elute |
| | Oligonucleotides | HIC or combination of HIC/SEC |
| | Via post-translational modification | Separation due to glycosylation, methylation or phosphorylation |
| Chemical Housing | Storage (e.g. of DNA) | Lyophilization of material on plug |
| | Reaction Vessel | Inert material that can serve as housing for chemical reactions |
| | Adding Chemicals to Reaction (e.g., dye, ethidium bromide, trypsin) | Added chemicals can be lyophilized, trapped within pores, or held in by surface tension. |
| Manipulation | Lysing of Cells | Shearing of cell membranes by high-force passage through pores of defined size. |
| | Liquid Handling of HTP Applications | Utilization of tips as a method to add chemicals or perform reactions will streamline HTP applications |
| Indicator | Protein Concentration | Reactive substance can be conjugated to particle surface |
| | NA Concentration | Reactive substance can be conjugated to particle surface (HDPE and/or beads) |
| | pH | Immobilization of pH indicator molecules onto porous beads |
| | Presence of other Reagents | Reactive substance can be conjugated to particle surface (HDPE and/or beads) |
| | Amplified Detection | Detection via fluorescence potentially utilizing a secondary indicator to amplify signal |
| | Temperature | Immobilization/Incorporation of temperature sensitive molecules/particles |

Having generally described the invention, the same will be more readily understood by reference to the following examples, which are provided by way of illustration and are not intended as limiting.

EXAMPLES

Example 1

Preparation of High Density Polyethylene:Silica Based Porous Media

The following example provides the recipe for preparing one embodiment of the porous media of the present invention. Approximately 1 g of high density polyethylene, purchased from Ticona AG, was mixed for 5 minutes with 1 g of C-18 silica particles (32-63 micrometers, 100 angstrom, ICN-RP18), purchased from ICN, Inc. The components were mixed at room temperature using a IKA produced MS1 minishaker. The combination resulted in a 1:1 ratio of silica particle:polyethylene particle. The porous media can be fed into a target housing using gravity or mechanical means. Sintering parameters for this composition included 155° C. on a sintering block for 2 minutes.

Example 2

Porous Media Showed Little or No Particle Leakage from a Pipette Tip Under Normal Use Conditions A particle leakage assay was performed to determine the 'leakage' levels of porous media that has been sintered into a pipette tip. Leakage levels were determined after normal pipette tip operating conditions, i.e., volumes, temperatures and pressures. Pipette tips having 2 mm porous media beds were prepared as discussed in Example 1. Porous media within each tip was pre-wetted, equilibrated with buffer, and sample bound, washed and eluted using a standard desalting protocol. In detail, a pipette is set to 10 µl and securely attached to a porous media containing pipette tip as described above. The pipette plunger is depressed to aspirate 10 µl of pre-wet solution. The pre-wet solution is discarded and the process repeated. Approximately 10 µl of equilibration/wash solution is aspirated through the porous media and discarded, the process is repeated. A solution of water was aspirated and expelled through the porous media and after each cycle dispensed to a glass slide and allowed to dry.

Each slide was then visually examined at 40 to 200× magnification to determine the amount of expelled porous media present in the flow through and eluate.

Data from a series of tests indicated that little if any porous media was expelled during these standard desalting protocols. In fact, in a series of more than ten tests, no porous media was detectable using these visual techniques (data not shown). This Example again illustrates that the sintered porous media containing pipette tips do not require adhesives, mechanical aids (for example frits), or non-sintering fixation methods, in order to maintain integrity in the pipette tip.

Example 3

Porous Media Has a High Analyte Binding Capacity as Determined By Coomassie Blue Binding Assay This Example illustrates the binding capacity of several different porous media compositions. Initially, the ratio of polymer particles to binding particles was varied to determine the ratio that provides an optimal binding capacity. Next, actual binding particle compositions of the porous media were varied with respect to a number of different C-18 silica particles, to determine an optimal C-18 silica.

Initially, the capacity of different ratios of polymer to binding particles was determined using a coomassie blue binding assay. Coomassie Blue is a small hydrophobic dye molecule that can be used to gauge the affinity of a porous media for low molecular weight molecules. Generally, each test porous media composition was pre-wetted and equilibrated in a normal desalting protocol (see Example 1). Dye was passed through each tip ten independent times. The porous media in each tip was then washed two times with 0.1% TFA solution, and the bound coomassie eluted with 70% acetonitrile/0.1% TFA into a 10 µl volume. The amount of coomassie in the eluate was measured using a spectrophotometer and the absorbance reading converted into nanograms of material using a standard curve.

Figure 3:
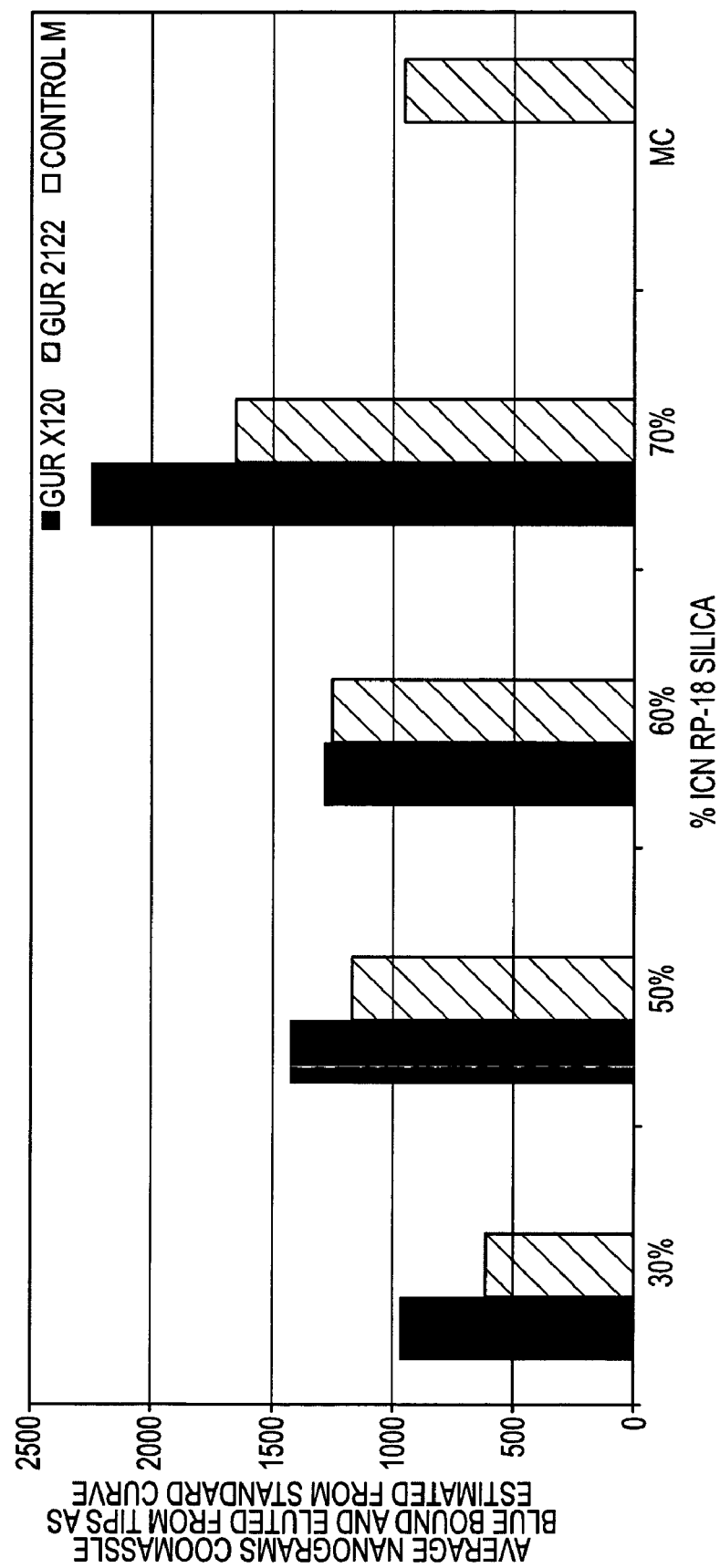
FIG. 3 is a bar graph showing the results of a coomassie blue binding assay where an amount of GUR X120 and GUR 2122 are combined with 30%, 50%, 60% or 70% C18 silica particles by weight to test the binding capacity of these different porous media compositions.

As shown in FIG. 3, GUR X120 or GUR 2122 polymers were mixed with 30%, 50%, 60%, or 70% C18 silica particles (ICN RP-18) by weight to prepare four different porous media compositions (eight total). Each porous media composition was sintered into a 10 µl pipette tip and binding capacity tested using the coomassie blue binding assay, as described above. The bar graph shown in FIG. 3 illustrate that GUR X120 consistently provided higher binding capacities for low molecular weight molecules as compared to GUR 2122, although both polymer components provided adequate results, i.e., comparable to control levels obtained using conventional methods. Further, porous media compositions having 50 to 70% C-18 particles by weight showed higher binding capacity as compared to the 30% silica composition, or to a competitor control tip. This data indicates that porous media compositions, as low as 30% binding particle by weight, showed substantial binding affinity for low molecular weight molecules, and that both polyethylene polymer types (GUR X120 and GUR 2122) were useful as the polymer constituent in the porous media compositions of the invention.

Figure 4:
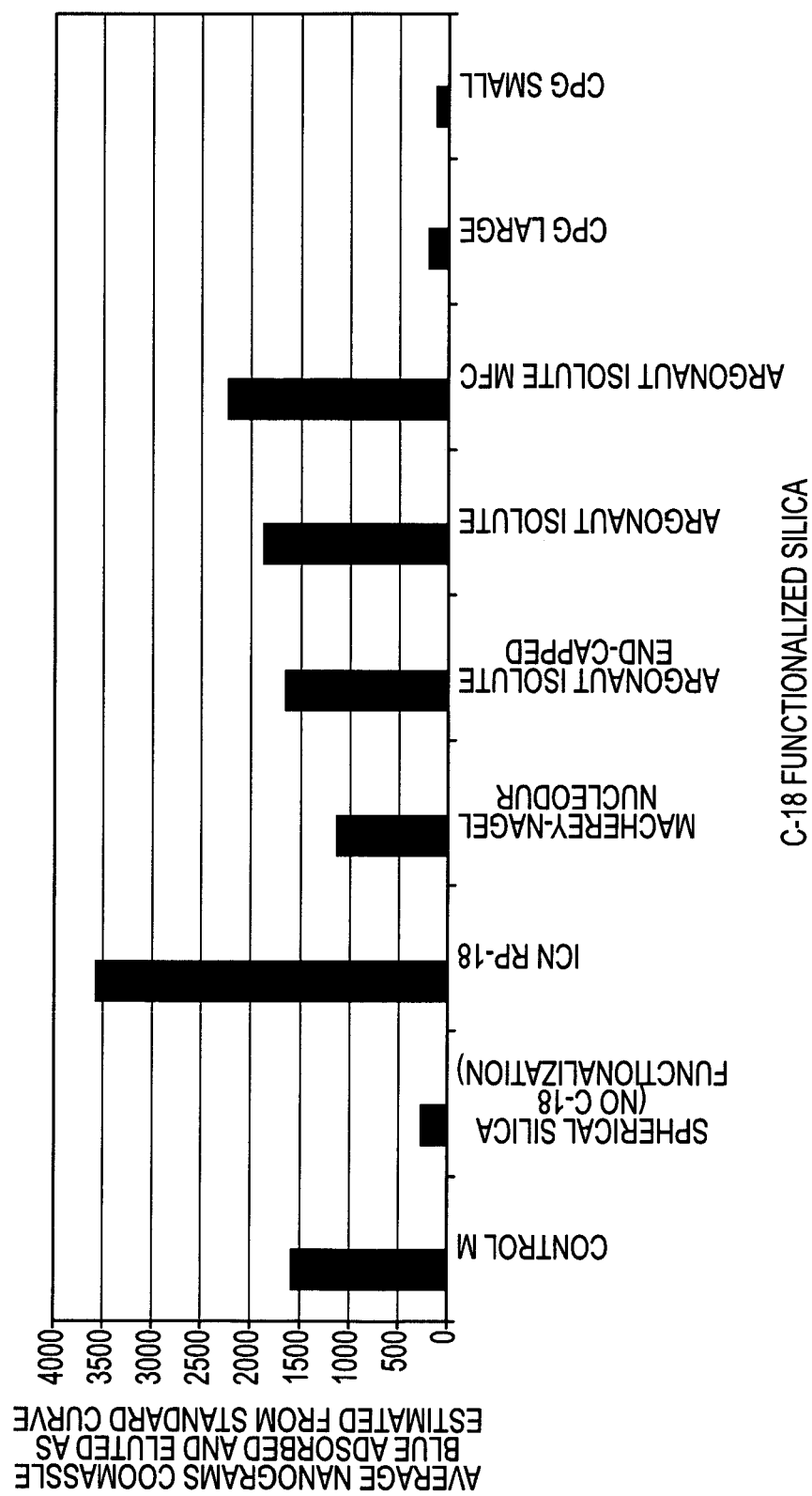
FIG. 4 is a bar graph showing the results of a coomassie blue bind assay where 50% GUR X120 is combined 50% by weight different C-18 functionalized silica particles. Each porous media combination was tested to compare the binding capacity of the different silica particles to each other in the context of binding low molecular weight materials.

FIG. 4 illustrates that different types of silica binding particles have differing effects on the binding capacity of the porous media. Each type of tested silica particle was mixed with 50% GUR X120 polymer by weight and tested for coomassie blue binding (as above) (note that in each case the silica particle represents 50%, by weight, of the porous media). As can be seen from the results in FIG. 5, different silica particle types are more effective at binding low molecular weight molecules, although all of the tested silica particles showed some level of binding. Preferred results were obtained with ICN RP-18, Argonaut isolute MFC, Argonaut isolute, and Argonaut isolute end-capped.

This Example provides evidence of utility for the porous media in binding low molecular weight molecules, which under like conditions was more impressive than at least one commonly used competitor type tip for the same purposes.

Example 4

Porous Media Concentrates and Separates CYT C Digested Peptides

The binding capacity of the porous media described in Example 1 was determined using a SDS-PAGE/Cytochrome Assay Cytochromome C capacity assay. Cytochrome C, a protein of roughly 13,000 daltons, was bound to porous media containing pipette tips using the desalting protocol as described in Example 2. In particular, a sample containing 1 µg of CYT C was passed over the porous media 10 times. The protein was eluted in five microliters of 70% acetonitrile. The eluate was loaded onto a 15% SDS-polyacrylamide gel alongside the flow-through from the reaction, and the protein visualized using a standard silver staining protocol. Total amounts of protein were visualized, either in the eluate or the flow-through, thereby indicating the effectiveness of the porous media at separating out a protein of 13 kDa. A total depth of 3 mm was used for purposes of this Example.

Figure 5:

As shown in FIG. 5, the porous media (GUR X120+50% ICN RP-18) was extremely effective at separating CYT C peptide from the sample, and was comparable to the results seen with a conventional pipette tip from Millipore (ZTC 18M096 product #). Note that a vast majority of the CYT C was retained on the tip, see eluate lane, as compared to total amount of CYT C in the flow-through. This Example again illustrates the utility of the invention for binding capacity of 13 kDa sized proteins.

Example 5

Porous Media Is Effective at Desalting Protein Digest

The effectiveness of the porous media for desalting peptide digest was determined using a MALDI-ToF assay. Pipette tips having the porous media of the present invention were prepared as described in Example 1. A porous media composition was used to desalt protein digests to determine if a strong signal with low background was produced in the MS spectra. Approximately 100 ng of Cytochrome C in-tube digest was examined. Elution with a 75% acetonitrile, 0.1% TFA buffer and a 50% acetonitrile solution, 0.1% trifluoroacetic acid saturated with crystallization matrix α-cyano-4-hydroxycinnamic acid were compared.

Figure 6A:
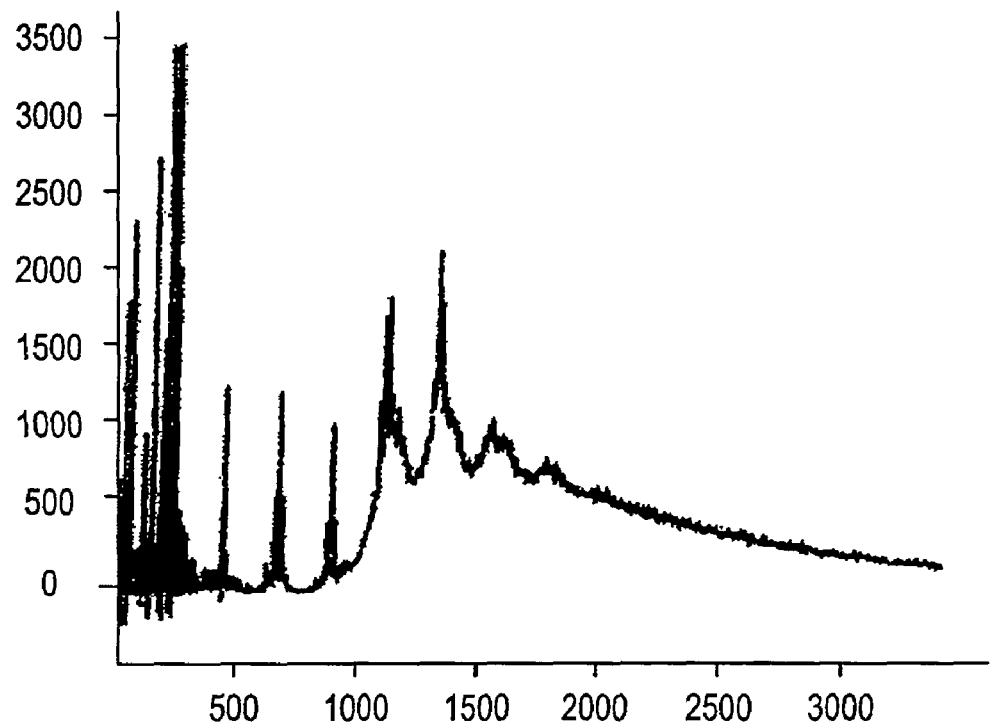
FIG. 6A-D show a spectral analysis (MS Maldi Tof Spectra) of unpurified samples (A and B) and purified samples using a porous media of the present invention (C and D). With regard to A and B, unpurified cytochrome C digest was concentrated in a speed-vac to three microliters, spotted on the MS target and overlayed with crystallization matrix. With regard to C and D, cytochrome C digest were purified with 2 mm 50% GUR X120 sintering polymer/50% ICN RP-18 C18 functionalized silica prototype tips and (C) eluted with 3 microliters crystaqllization matrix directly onto the MS target or (D) eluded with three microliters of 50% acetonitrile, 0.1% TFA elution buffer, spotted on the MS target and overlayed with crystallization matrix.
Figure 6B:
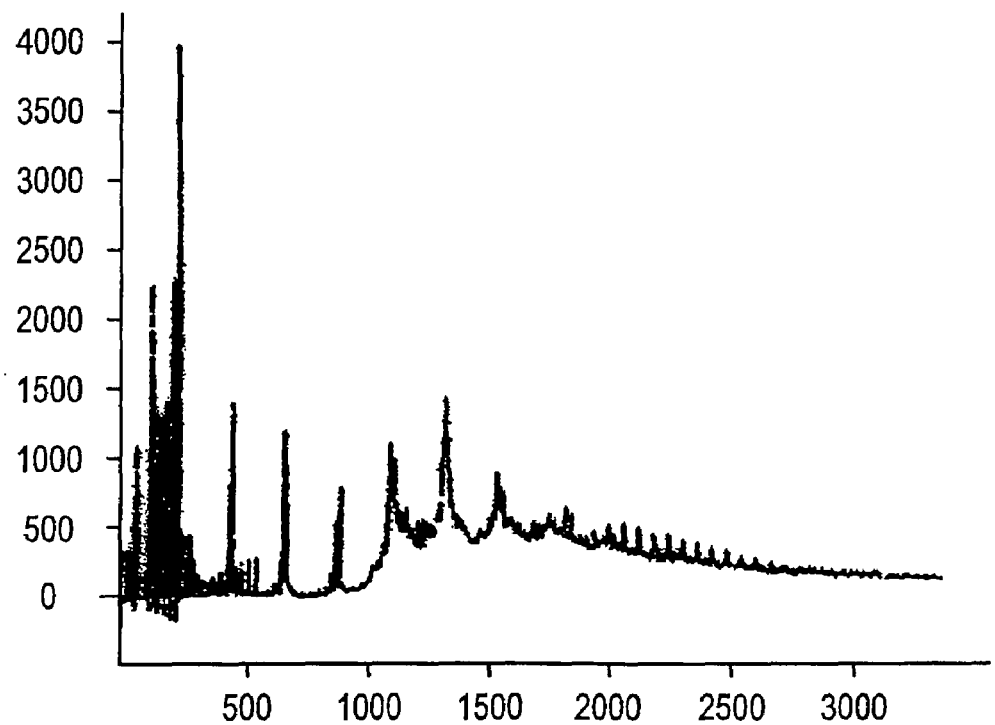

FIGS. 6A and 6B show the spectra profiles for unpurified cytochrome C digest concentrated in a speed-vac to the same volume as the concentration obtained with the porous media of the present invention (approximately 20 microliters to 3 microliters). The speed vac concentrated sample was spotted on a MS target and overlayed with crystallization.

Figure 6C:
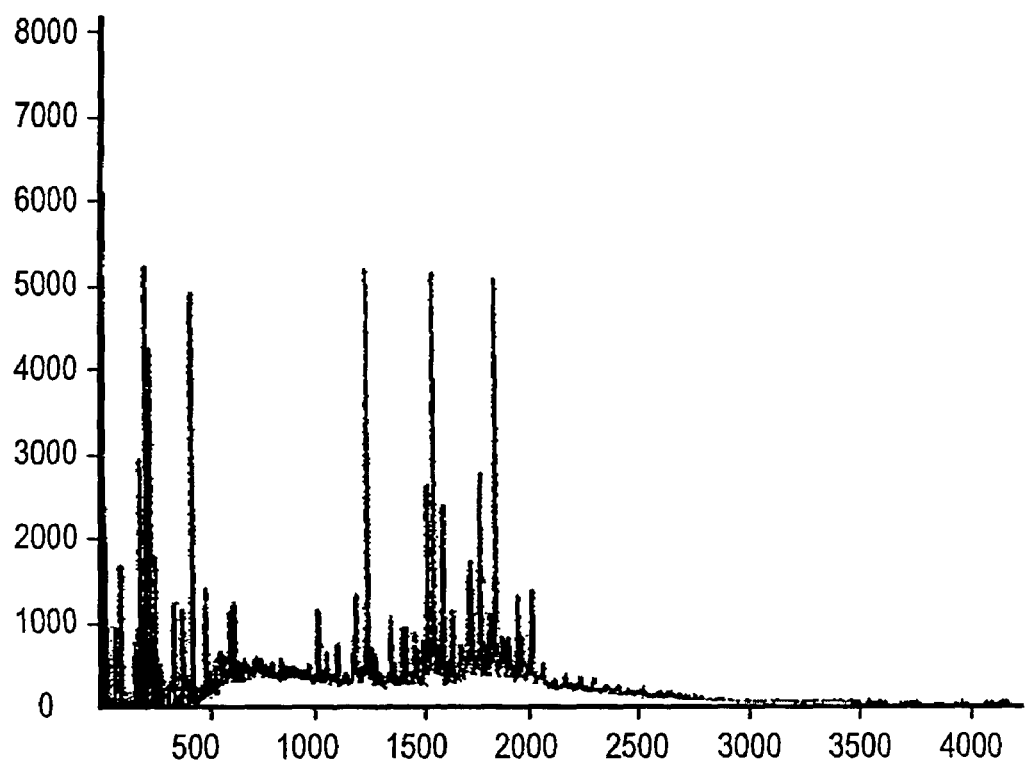
Figure 6D:
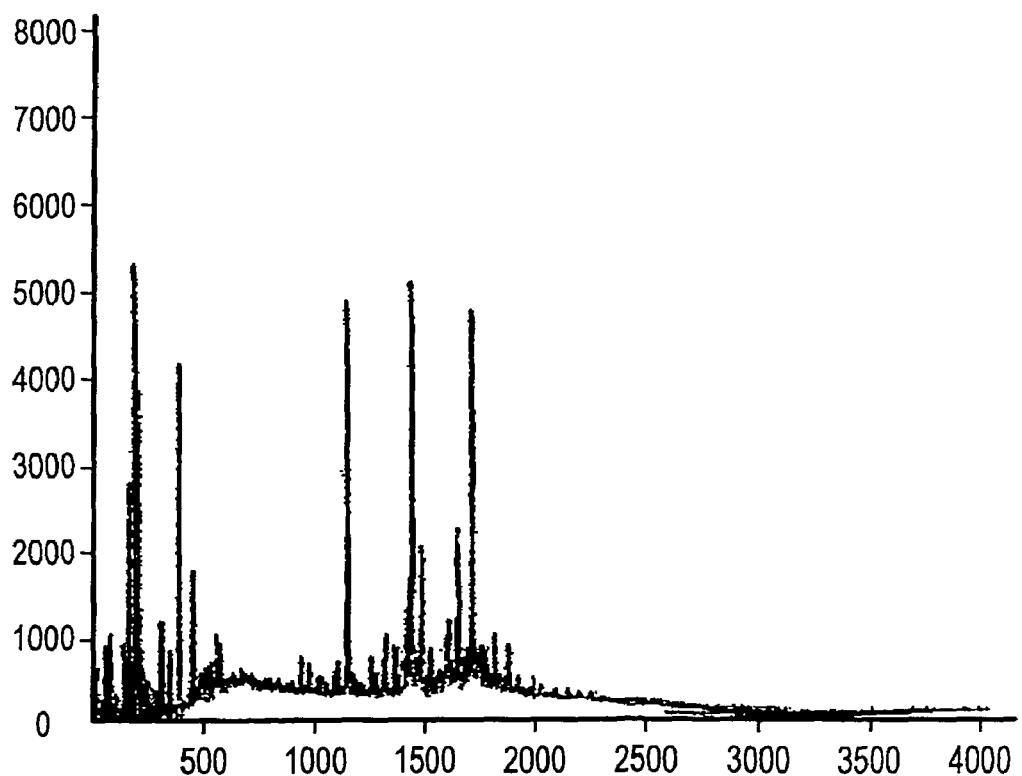

In comparison, FIGS. 6C and 6D show the same starting sample desalted over a 2 mm thick porous media (50% GUR X120 with 50% ICN RP-18), from a starting volume of 20 microliters to three microliters. The samples were eluted directly onto the MS target (C), or eluted with a 75% acetronitrile, 0.1% trifluoroacetic acid elution buffer and spotted onto the MS target. Samples were overlayed with crystallization matrix.

The data in this example illustrates the effectiveness of the porous media of the present invention at desalting peptide digest. Compare the signals and background as shown in FIGS. 6A and B to FIGS. 6C and 6D.

Example 6

Preparation of Porous Media Filter Disc and Incorporation into a Spin Device

The preceding Example illustrates the utility of using the porous media of the invention to capture DNA from a cell lysate—and in particular, the sorptive properties of the silica particles within a porous media to capture DNA within the context of a cell lysate. Generation of the spin device was cost effective, straight forward, and quick. Results were comparable to results using conventional spin devices.

A porous media filter disc (diameter 6.8 mm, height 4 mm) consisting of 33% diatomaceous earth (Sigma D-5384) and 67% high density polyethylene (GUR 4186) (Ticona AG) was sintered in a sintering block at 155° C. for four minutes. After cooling, the porous media filter disc was inserted into a spin device housing having a standard polymer frit (7 micron).

pUC19 plasmid was purified from XL2 cells using the Eppendorf FastPlasmid MiniKit in combination with the above described spin device. However, the standard Eppendorf FastPlasmid MiniKit spin device was replaced with the porous media filter disc containing spin device of the present invention. Eluted plasmid was visualized on ethidium bromide stained 1% agarose gel.

Figure 7:
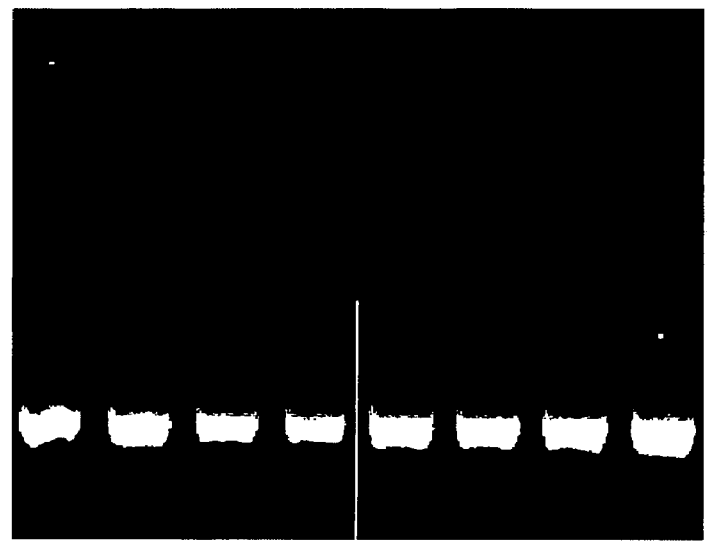
FIG. 7 shows an ethidium bromide stained 1% agarose gel having porous media filter disc purified nucleic acid from a nuclear extract. Various porous media filter discs were used to isolate target plasmid molecules (pUC19) from XL2 cell extracts. Sorptive bead mixtures within the porous media filter discs consisted of diatomaceous earth (Sigma, D-5384).

FIG. 7 shows that the porous media filter discs of the present invention function at least as well as control filter spin devices (see lanes 1-4 (control) vs. porous media filter discs (5-8). This data again illustrates the utility of the present invention. Generation of the porous media filter disc was cost effective, straight forward and quick.

Example 7

Porous Media Reduces Unincorporated Dye from Labeling Reaction

A pipette tip having a porous media embodiment of the invention was used to remove unincorporated dye from a BSA labeling reaction. Pipette tips were prepared having C-18 polyethylene beads to a depth of 2 mm and pores of approximately 100 Å in diameter. Dye samples were prepared according to Amersham kit number PA25001 in sodium carbonate. Samples were prepared having unlabelled BSA, labeled BSA with no dye, and labeled BSA in the presence of dye [approximately 5 microliters of 1 mg/ml BSA (labeled with Cy5) was mixed with 5 microliters of dye as prepared above]. Each sample was passed up and down within a pipette tip ten times and run on a 8-16% SDS-polyacrylamide gradient gel (Biorad Criterion Gel). In order to compare the media compositions of the present invention to other dye removal technologies a dye/BSA sample was passed over a Sephadex G50 column as a positive control (see lane 2).

Figure 8:
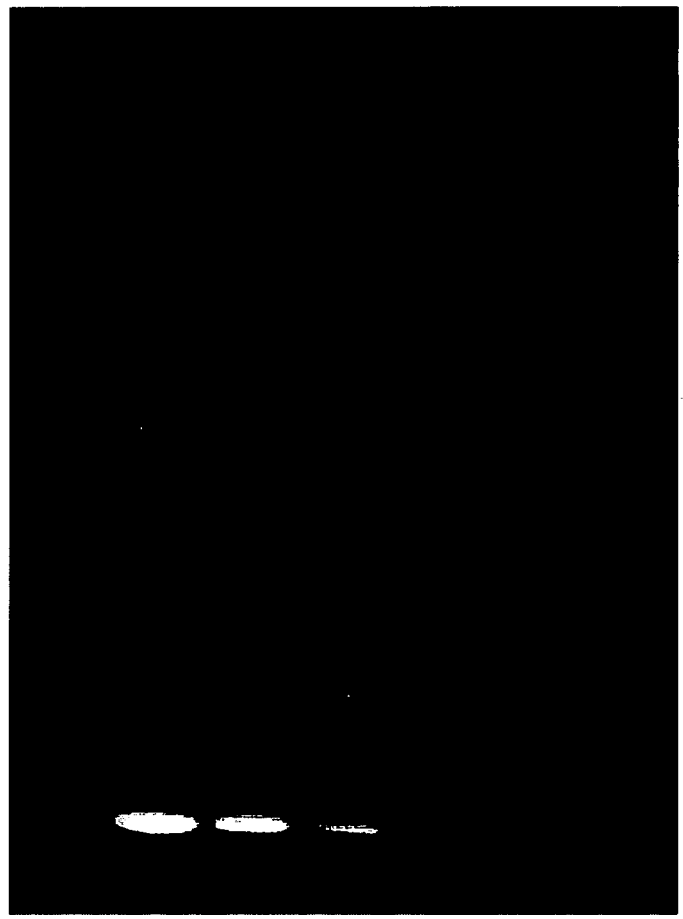
FIG. 8 shows an ethidium bromide stained 1% agarose gel having porous media removal of free dye from a dye incorporation assay. Lanes 4-7 show increasing removal of free dye by the methods and compositions of the present invention.

As shown in FIG. 8, successive removal of unincorporated dye occurs with each pass of a BSA/dye sample over the media of the present invention (compare lane 4 to lanes 5-7). Results indicate that pipette tip embodiments of the present invention provide equivalent results as those shown for Sephadex G-50.

The present Example illustrates that the porous media of the present invention is useful in discriminating between larger and smaller molecules. Smaller molecules like unincorporated dyes are removed from the sample by a combination of size exclusion chromatography and hydrophobic interaction chromatography when the smaller sized material migrates into porous beads and binds to the internal surfaces of the polymer particles. Larger molecules, for example labeled BSA, are too large to enter the pores and thereby passes out of the tip.

Example 8

Porous Media Can Eliminate Metal Ions and Other Bio-contaminants from Biological Samples Porous Media of the present invention can be used to remove metal ions from nucleic acid solutions prior to PCR or other like metal ion sensitive reaction. As is known, several metal ions limit or prevent PCR from proceeding. These metal ions are often present in buffer and aqueous solutions used in standard PCR protocols. Porous media embodiments of the present invention can be fabricated as in Example 1, typically having a depth of 2-5 mm. Nucleic acid containing samples having contaminating metal ions are passed over the pipette tips containing the porous media.

It is anticipated that approximately $1.62 \times 10^{-2}$ to $1.34 \times 10^{-1}$ mol/mg resin of each target metal ion will be removed by passing them over the porous media embodiments of the present invention, while other constituents of the reaction buffer will pass through for use in PCR.

The present Example will likely show that embodiments of the invention are comparable to the Chelex columns (BioRad Inc.) and are preferable to Chelex columns due to the more tractable format.

The invention has been described with reference to specific examples. These examples are not meant to limit the invention in any way. It is understood for purposes of this disclosure, that various changes and modifications may be made to the invention that are well within the scope of the invention. Numerous other changes may be made which will readily suggest themselves to those skilled in the art and which are encompassed in the spirit of the invention disclosed herein and as defined in the appended claims.

This specification contains numerous citations to patents, patent applications, and publications, each is hereby incorporated by reference for all purposes.

What is claimed is:

1. A filtration device comprising a housing, said housing containing a porous media comprising from about 5 to 95% sorptive porous silica beads, by weight, and 5 to 95% discontinuous non-functionalized polymer particles, by weight;
    wherein the discontinuous polymer particles provide structural integrity for the porous media, maintaining channels through the bead pores and around the sorptive silica beads; and
    wherein the porous media is sintered into the housing such that the polymer particles are structurally held onto the sorptive beads and housing walls without completely melting to form a continuous polymer matrix.

2. The filtration device of claim 1 wherein the sorptive silica beads are selected from the group consisting of C-4, C-8 and C18 silica beads.

3. The filtration device of claim 1 wherein the housing comprises a well within a multi-well filter plate.

4. The filtration device of claim 1 wherein the housing comprises a pipette tip.

5. The filtration device of claim 1 wherein the porous media comprises from about 30% to about 70% sorptive silica beads, by weight.

6. The filtration device of claim 1, wherein said sorptive silica beads and said discontinuous non-functionalized polymer particles account for about 100% by weight of said porous media.

7. The filtration device of claim 6 wherein the sorptive silica beads are selected from the group consisting of C-4, C-8 and C18 silica beads.

8. The filtration device of claim 6 or 7 wherein said non-functionalized polymer is a high density polyethylene.

9. The filtration device of claim 6 wherein the disc comprises from about 30% to about 70% sorptive silica beads, by weight.

10. The filtration device of claim 1, wherein said porous media consists essentially of from about 5 to 95% sorptive silica beads, by weight, and 5 to 95% discontinuous non-functionalized polymer particles, by weight.

11. The filtration device of claim 10 wherein the sorptive silica beads are selected from the group consisting of C-4, C-8 and C18 silica beads.

12. The filtration device claim 10 or 11 wherein said non-functionalized polymer is a high density polyethylene.

13. The filtration device of claim 10 wherein the porous mediate consists essentially of from about 30% to about 70% sorptive silica beads, by weight.

14. The filtration device according to claim 1 wherein the discontinuous polymer particles have a lower melting temperature than polypropylene.

15. A method for fabricating a housing containing a porous media, said method porous media filter comprising:
    mixing from about 5% to about 95% sorptive porous silica beads by weight with about 5% to about 95% discontinuous non-functionalized polymer particles; and
    sintering the sorptive silica bead/discontinuous polymer particle mixture into the housing such that the polymer particles are structurally held onto the sorptive beads and housing walls without completely melting to form a continuous polymer matrix; wherein the discontinuous polymer particles provide structural integrity for the porous media, maintaining channels through the bead pores and around the sorptive silica beads.

16. The method according to claim 15 wherein the sorptive silica beads are selected from the group consisting of C-4, C-8 and C18 silica beads.

17. The filtration device of claim 1 or 14 wherein said non-functionalized polymer is a high density polyethylene.

18. The method according to claim 15 or 16, wherein said non-functionalized polymer is a high density polyethylene.

19. The method according to claim 15, wherein said sorptive silica beads and said discontinuous non-functionalized polymer particles account for about 100% by weight of said porous media.

20. The method according to claim 19 wherein the sorptive silica beads are selected from the group consisting of C-4, C-8 and C18 silica beads.

21. The method according to claim 19 or 20, wherein said non-functionalized polymer is a high density polyethylene.

22. The method according to claim 15, wherein said fabricated porous media filter disc consists essentially of from about 5 to 95% sorptive silica beads, by weight, and 5 to 95% discontinuous non-functionalized polymer particles.

23. The method according to claim 22 wherein the sorptive silica beads are selected from the group consisting of C-4, C-8 and C18 silica beads.

24. The method according to claim 22 or 23, wherein said non-functionalized polymer is a high density polyethylene.

* * * * *